No. 739,069. Patented September 15, 1903.

UNITED STATES PATENT OFFICE.

OTTO ERNST AND FRANZ SCHOLL, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

RED MORDANT AZO DYE.

SPECIFICATION forming part of Letters Patent No. 739,069, dated September 15, 1903.

Application filed September 4, 1901. Serial No. 74,306. (No specimens.)

*To all whom it may concern:*

Be it known that we, OTTO ERNST, Ph. D., and FRANZ SCHOLL, Ph. D., citizens of the Empire of Germany, residing at Höchst-on-the-Main, in said Empire of Germany, have invented certain new and useful Red Mordant Azo Dyestuffs, of which the following is a specification.

We have found that a series of orange-yellow azo dyestuffs, becoming red on treatment with chromium, may be obtained if 1-phenyl-5-pyrazolone and its derivatives, non-substituted in the fourth position, be combined with the diazo compounds of ortho-amido-cresol-sulfonic acids. The azo dyestuffs thus obtained are of a bluer and purer shade on transforming their acid dyes on wool into chrome lakes after the usual methods than the dyestuffs obtained from ortho-amidophenol derivatives; but the directly-acid dyeings are also of valuable orange-yellow shades. The beforementioned red chrome lakes are distinguished by their remarkable fastness to light, which is at least equal to that of the alizarin dyestuffs. As diazo components we employ the diazotized 3-amido-2-cresol-5-sulfonic acid, the 3-amido-4-cresol-5-sulfonic acid, and the 3-amido-4-cresol-6-sulfonic acid, and as combining components we use 1-phenyl-3-methyl-5-pyrazolone or its sulfo and carbonic acid derivatives, which are capable of being combined. Any one of these diazo compounds we term herein for convenience an "amido-cresol-sulfonic acid." We term likewise any one of these combining components "a phenyl-pyrazolone." There is no essential difference in the shades of the dyestuffs thus obtained.

We illustrate the process as follows: 112.5 parts, by weight, of 3-amido-4-cresol-5-sulfonate of sodium are dissolved in one thousand parts of water. To this solution five hundred parts of diluted cold hydrochloric acid, containing one hundred and thirty-five parts of hydrochloric acid of 19° Baumé, are run in at about 10° centigrade. Hereby the free amido-cresol-sulfonic acid separates. On adding thirty-five parts of nitrite the acid redissolves in form of its yellow diazo compound. This diazo solution is run into a solution of ninety-one parts of technical pyrazolone and twenty-two parts of caustic soda and fifty-five parts of sodium carbonate in two thousand parts of water. The combination is complete after stirring for several hours at ordinary temperature, at which the dyestuff does not dissolve. When dry, the dyestuff is an orange-brown powder, soluble with difficulty in cold, more readily in hot, water, to a brownish-yellow solution. In concentrated sulfuric acid the dyestuff dissolves to an orange-yellow solution and separates on addition of water as orange-yellow flakes. It directly dyes wool yellow in an acid bath. On subsequent treatment with chromates this dye becomes a fast red. The manufacture of the other dyestuffs from the said isomeric ortho-amido-cresol-sulfonic acids and the acid derivatives of 1-phenyl-5-pyrazolone is the same as described in the example, only the dyestuffs are naturally of different solubilities.

Having now described our invention, what we claim, is—

1. The herein-described process for the manufacture of red mordant azo dyestuffs, which consists in combining diazotized ortho-amido-cresol-sulfonic acids with 1-phenyl-5-pyrazolones capable of being combined, substantially as set forth.

2. Monoazo dyestuffs, obtained from diazo compounds of ortho-amido-cresol-sulfonic acids and 1-phenyl-5-pyrazolones capable of being combined and which are brownish powders soluble in water and insoluble in alcohol, ether and benzene, their solutions in concentrated sulfuric acid having a reddish-yellow color.

3. An orange-colored dyestuff having the formula: 3-amido-4-cresol-5-sulfonic acid (diazot.) +1-phenyl-5-pyrazolone, being an orange powder soluble with difficulty in cold water, insoluble in absolute alcohol, ether and benzene; its solutions in concentrated sulfuric acid having a reddish-yellow color; dyeing wool yellow in an acid-bath and forming a red chrome lake.

In testimony that we claim the foregoing as our invention, we have signed our names in presence of two subscribing witnesses.

OTTO ERNST.
FRANZ SCHOLL.

Witnesses:
ALFRED BRISBOIS,
HEINRICH HAHN.